United States Patent
Yoshida et al.

(10) Patent No.: US 10,782,941 B1
(45) Date of Patent: Sep. 22, 2020

(54) REFINEMENT OF REPAIR PATTERNS FOR STATIC ANALYSIS VIOLATIONS IN SOFTWARE PROGRAMS

(71) Applicant: FUJITSU LIMITED, Kawasaki-shi, Kanagawa (JP)

(72) Inventors: Hiroaki Yoshida, Cupertino, CA (US); Mukul Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/447,535

(22) Filed: Jun. 20, 2019

(51) Int. Cl.
*G06F 9/44* (2018.01)
*G06F 11/36* (2006.01)
*G06F 9/445* (2018.01)
*G06F 8/65* (2018.01)
*G06F 11/07* (2006.01)
*G06F 8/36* (2018.01)

(52) U.S. Cl.
CPC ..................................... *G06F 8/36* (2013.01)

(58) Field of Classification Search
CPC ..... G06F 2221/2135; G06F 2221/0737; G06F 2221/2101; G06F 21/10; G06F 8/36; G06F 8/65; G06F 8/71; G06F 8/70; G06F 11/3688; G06F 11/3604; G06F 1/72; G06F 1/24; G06F 1/84; G06F 1/70; H04L 63/20
See application file for complete search history.

(56) References Cited

U.S. PATENT DOCUMENTS

| | | | | |
|---|---|---|---|---|
| 8,549,465 B2 * | 10/2013 | Allen | ........................ | G06F 8/70 717/100 |
| 8,924,935 B1 * | 12/2014 | Chopra | ..................... | G06F 8/71 717/120 |
| 8,924,936 B2 * | 12/2014 | Baker | .................. | G06F 11/3604 717/124 |
| 9,513,948 B2 * | 12/2016 | Bucknell | ............. | G06F 9/45558 |
| 10,521,224 B2 * | 12/2019 | Saha | ......................... | G06F 8/33 |
| 2017/0212829 A1 * | 7/2017 | Bales | ................... | G06F 11/3612 |

OTHER PUBLICATIONS

Soto et al., A deeper look into bug fixes: patterns, replacements, deletions, and additions, 4 pages (Year: 2016).*

(Continued)

*Primary Examiner* — Thuy Dao
(74) *Attorney, Agent, or Firm* — Fujitsu Patent Center

(57) ABSTRACT

According to an aspect of an embodiment, operations may include retrieving a set of repair patterns and a second set of violations of software programs. The operations may further include selecting an unfixed violation from the retrieved second set of violations and a repair pattern from the set of repair patterns. The operations may further include executing a first set of operations for refinement of repair patterns. The first set of operations may include applying the selected repair pattern on the selected unfixed violation, removing the applied repair pattern from the set of repair patterns based on the determination that a repair result corresponds to a violation. The first set of operations may further include reselecting next repair pattern as the selected repair pattern. The operations may further include obtaining a refined set of repair patterns by iteratively executing the first set of operations for the set of repair patterns.

20 Claims, 9 Drawing Sheets

(56) References Cited

OTHER PUBLICATIONS

Z. Chen, Helping mobile software code reviewers: a study of bug repair and refactoring patterns, 2 pages (Year: 2016).*

Reudismam Rolim et al., "Learning Syntactic Program Transformations from Examples", arXiv:1608.090000v1 [cs.SE] Aug. 31, 2016 (12 pages).

Kui Liu et al., "Mining Fix Patterns for FindBugs Violations", arXiv:1712.03201v2 [cs.SE] Oct. 9, 2018 (31 pages).

* cited by examiner

```
for (String name : insQueries.keyset()) {
  List<List<Object>> params = insParams.get(name);
  try {
    if (!params.isEmpty()) {
      SqlDb.Static.execBatchUpd(conn, insQueries.get(name), params);
    }
  } catch (BatchUpdateException bue) {
    SqlDb.Static.log(bue, insQueries.get(name), params); }
}
```
— 312
— 314
— 326

```
for (Map.Entry<String, String> entry : insQueries.entrySet()) {
  List<List<Object>> params = insParams.get(name);
  try {
    String name = entry.getKey();
    if (!params.isEmpty()) {
      SqlDb.Static.execBatchUpd(conn, entry.getValue(), params);
    }
  } catch (BatchUpdateException bue) {
    SqlDb.Static.log(bue, entry.getValue(), params); }
}
```
— 316
320
318
314

```
for (Map.Entry<String, String> entry : insQueries.entrySet()) {
  List<List<Object>> params = insParams.get(name);
  try {
    String name = entry.getKey();
    if (!params.isEmpty()) {
      SqlDb.Static.execBatchUpd(conn, entry.getValue(), params);
    }
  } catch (BatchUpdateException bue) {
    SqlDb.Static.log(bue, entry.getValue(), params); }
}
```
— 322
320
318
314

```
for (Map.Entry<String, String> entry : insQueries.entrySet()) {
  String name = entry.getKey();
  List<List<Object>> params = insParams.get(name);
  try {
    if (!params.isEmpty()) {
      SqlDb.Static.execBatchUpd(conn, entry.getValue(), params);
    }
  } catch (BatchUpdateException bue) {
    SqlDb.Static.log(bue, entry.getValue(), params); }
}
```
— 324
328
318
314

*FIG. 3B*

REFINEMENT OF REPAIR PATTERNS FOR STATIC ANALYSIS VIOLATIONS IN SOFTWARE PROGRAMS

FIELD

The embodiments discussed in the present disclosure are related to refinement of repair patterns for static analysis violations in software programs.

BACKGROUND

Many new technologies for software programs are being developed to identify and flag suspicious code patterns that can affect performance and correctness of the software program, or violate the style guidelines for a project. The suspicious code patterns or violations may not only affect operations to be performed by the software programs, but may also affect overall development time of the software programs. Certain solutions have been developed to repair different violations identified from various software programs in different domains. Such solutions are being referred as repair examples to repair or resolve the corresponding violations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include retrieving a set of repair patterns. Each of the set of repair patterns may be learned based on a first set of repair examples associated with a first set of violations of software programs. The operations may further include retrieving a second set of violations of the software programs. Each of the second set of violations may be an unfixed violation. The operations may further include selecting an unfixed violation of a first software program from the retrieved second set of violations of the software programs and selecting a repair pattern from the set of repair patterns. The operations may further include executing a first set of operations for the refinement of the set of repair patterns. The first set of operations may include applying the selected repair pattern on the selected unfixed violation to generate a repair result. The first set of operations may further include determining whether the generated repair result corresponds to a violation and removing the applied repair pattern from the set of repair patterns based on the determination that the generated repair result corresponds to the violation. The first set of operations may further include reselecting next repair pattern in the set of repair patterns as the selected repair pattern. The operations may further include obtaining a refined set of repair patterns by iteratively executing the first set of operations for the set of repair patterns based on the selected repair pattern.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3B illustrates exemplary repair patterns to repair violations in a software program;

DESCRIPTION OF EMBODIMENTS

Figure 1:
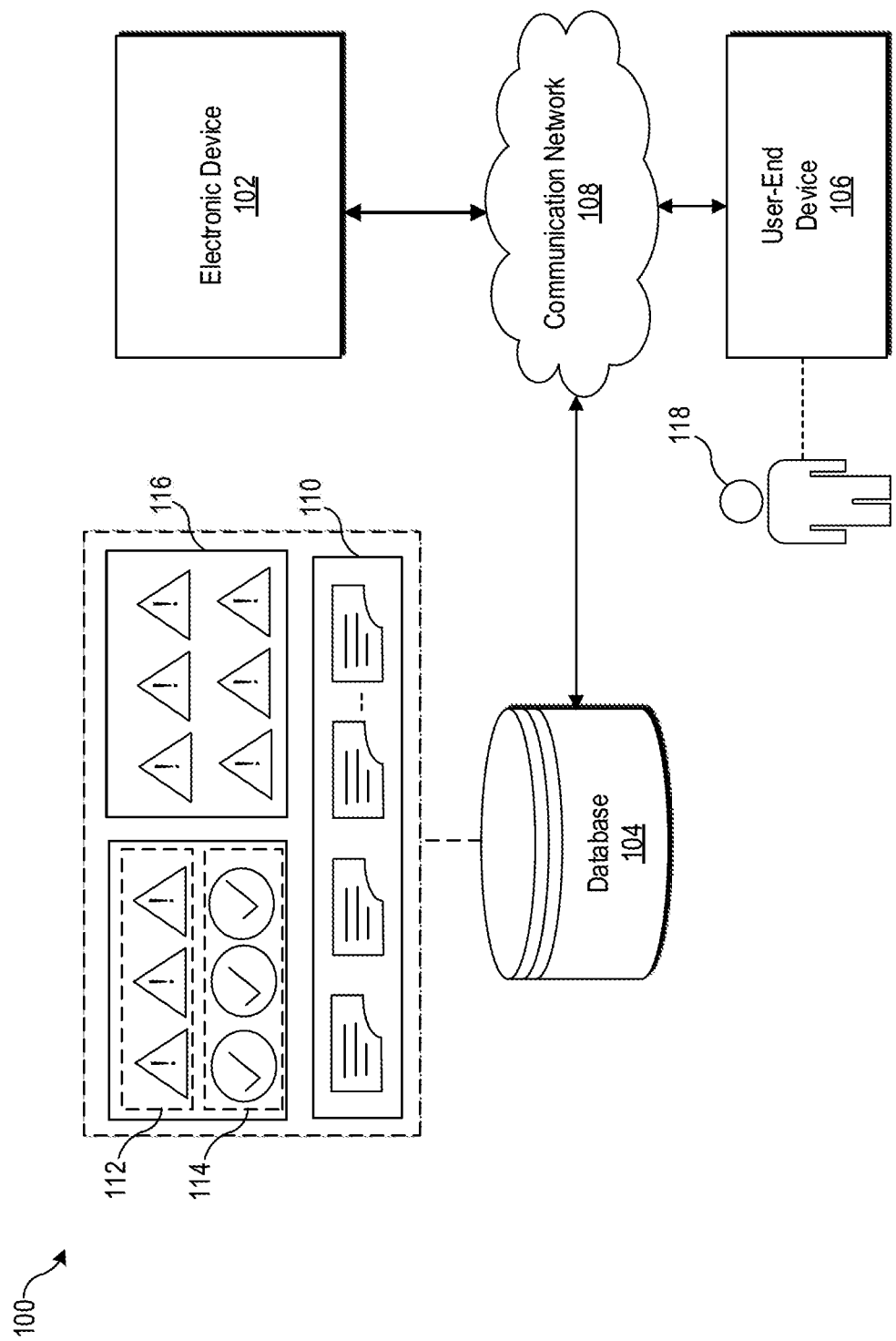
FIG. 1 is a diagram representing an example environment related to refinement of repair patterns for static analysis violations in software programs.

Some embodiments described in the present disclosure relate to refinement of repair patterns for violations which may be identified based on a static code analysis of program codes of software programs. Typically, software programs are developed in different domain specific languages to provide variety of solutions. During development or deployment of the software programs, several issues (e.g. faults, bugs, suspicious code, or violations) may be detected. These issues may not only effect the required operation or performance of the software program, but may also affect overall time for completion of development of the software program.

Certain static analyzer or static code analysis tools are available to automatically detect different violations in the software programs. These static code analysis tools may detect one or more syntax violations and/or semantic violations. These static code analysis tools may detect different attributes (for example type, line numbers, node name, or node attributes) of the identified violations. Further, these static code analysis tools may also detect stylistic violations, common software weaknesses, security vulnerabilities, and/ or other style guidelines violations. Example of the static code analyzer or static code analysis tools may include, but are not limited to, FindBugs, SpotBugs, PMD, Coverity, Facebook Infer, Google error-prone, SonarQube, Splint, cppcheck or Clang static analyzer. Such static code analysis tools may automatically detect violations in software programs in different domain specific languages (DSL).

Typically, repair operations or modifications may be used to repair the violations and transform a defective software program into an improved software program. With increase in development of software programs, the number of detected violations have also increased significantly. However, still the number of repair operations in comparison to the increase in number of detected violations are limited and insufficient.

Certain solutions were developed, which considered several repair operations, as repair examples, to automatically learn and generate repair strategies (or common repair patterns) through different learning techniques (for example, machine learning). Such solutions are referred as "programming by example (PbE)" based repair pattern learning or generation systems. For example, U.S. patent application Ser. No. 16/109,434 filed on Aug. 22, 2018, which is incorporated by reference herein in its entirety, discuss the generation and learning of fix patterns (hereinafter referred to as repair patterns) based on different detected defects (i.e. violations) in one or more software programs and based on edit operations (i.e. repair examples) associated with the detected defects. It may be noted that methods to generate the fix pattern (or repair pattern) by the referenced application are merely an example. Although, there may be different other ways to generate or learn the repair patterns based on different repair examples or edit operations performed to repair of the violations.

The generated repair patterns may be used to perform repair operations on the defected software program. The repair patterns may also correspond to, generalize, or represent one or more edit operations (as repair examples) performed on the detected violations to repair the detected violations or to obtain repaired software programs. Similarly, several improved software programs may identify one or more edit operations with respect to different defective software programs (including violations) to learn or generate different repair patterns. The repair pattern may be generated in a format which may be compatible with a source code of the software program, including the violation repaired using the repair pattern. Certain examples of the repair examples and repair patterns are described in detail, for example, in FIG. 2A and FIG. 2B.

The generated repair patterns may be able to repair certain reported violations. Still, there may be several unfixed or unseen violations which may not have been tested against the common repair patterns or attempted to be repaired using the common repair patterns. This may be due to insufficient number of repair examples to generate the repair patterns (or fix patterns or repair strategies) which may not be common or capable enough to repair the unfixed or unseen violations. Thus, in order to resolve different unfixed violations, an improvement or refinement of the automatically generated repair patterns is required.

According to one or more embodiments of the present disclosure, the technological field of software project management, including software security, software debugging, software verification and validation (V&V) may be improved by configuring a computing system in a manner in which the computing system is able to execute a trained model storing various repair patterns (or strategies) on variety of unfixed or unseen violations and further refine the store repair patterns based on the execution of the trained model on variety of unfixed or unseen violations.

The system may be configured to retrieve the stored repair patterns which may be generated/learned based on various repair examples. The system may be further configured to retrieve a set of unfixed violations from a database and apply each of the retrieved repair patterns on each of the retrieved unfixed violations. The system may be further configured to determine whether the application of each of the repair patterns on each of unfixed violations result in a repair of the unfixed violation. In case of determination that a repair pattern is not able to repair a corresponding unfixed violation, the determined repair pattern may be removed from the learned system of the repair patterns to obtain a refined system of repair patterns. The refined repair patterns may demonstrate an improved accuracy (or quality) for repairing several unfixed or newly discovered violations. In some embodiments, the refined system may include one repair pattern (as "One Best" repair pattern) capable to repair all unfixed violations of a particular type. In another embodiment, the refined system may include a set of repair patterns which may be accurate enough to repair a threshold number (for example "90%" or more) of violations of the particular type.

Embodiments of the present disclosure are explained with reference to the accompanying drawings.

FIG. 1 is a diagram representing an example environment related to refinement of repair patterns for static analysis violations in software program, arranged in accordance with at least one embodiment described in the present disclosure. With reference to FIG. 1, there is shown an environment 100. The environment 100 may include an electronic device 102, a database 104, a user-end device 106, and a communication network 108. The electronic device 102, the database 104, and the user-end device 106 may be communicatively coupled to each other, via the communication network 108. In FIG. 1, there is further shown a set of repair patterns 110, a first set of violations 112, a first set of repair examples 114, and a second set of violations 116 stored in the database 104. The second set of violations 116 may correspond to unseen or unfixed violations stored in the database 104. There is further shown a user 118 who may be associated with or operating the electronic device 102. The user 118 may be a person with software development, debugging, or testing experience.

The electronic device 102 may comprise suitable logic, circuitry, and interfaces that may be configured to retrieve the set of repair patterns 110 from the database 104. The set of repair patterns 110 may be learned or generated based on analysis of the first set of repair examples 114 associated with the first set of violations 112 of different software programs. The first set of violations 112 may correspond to a portion of defective code for which the set of repair examples 114 are available and therefore, referred to as fixed violations. The second set of violations may correspond to a portion of defective code for which no repair examples are available and therefore, referred to as unfixed violations.

The first set of violations 112 and the second set of violations 116 may correspond to faults or bugs detected from the software programs by various static code analysis tools known in the art. Also, each of the first set of violations 112 and the second set of violations may be associated with a violation description and a violation category. An example of violation descriptions and associated violation categories is provided in table 1, as follows:

TABLE 1

Example Violation Descriptions and Categories

| Violation Description | Violation Category |
|---|---|
| DE: Method might drop exception | Bad practice |
| DMI: Random object created and used only once | Bad practice |
| BC: Impossible cast | Correctness |
| DLS: Useless increment in return statement | Correctness |
| DMI: Reversed method arguments | Correctness |
| GC: No relationship between generic parameter and method argument | Correctness |
| OBL: Method may fail to clean up stream or resource | Experimental |

TABLE 1-continued

Example Violation Descriptions and Categories

| Violation Description | Violation Category |
| --- | --- |
| DP: Method invoked that should be only be invoked inside a doPrivileged block | Malicious code vulnerability |
| MS: Field is a mutable array | Malicious code vulnerability |
| DC: Possible double check of field | Multithreaded correctness |
| Bx: Boxing/unboxing to parse a primitive | Performance |
| Dm: Method invokes inefficient new String( ) constructor | Performance |
| Dm: Empty database password | Security |
| PT: Absolute path traversal in servlet | Security |
| DLS: Dead store to local variable | Dodgy Code |
| FE: Test for floating point equality | Dodgy Code |
| IA: Potentially ambiguous invocation of either an inherited or outer method | Dodgy Code |

The electronic device 102 may be configured to retrieve the second set of violations 116 (i.e. unfixed or unseen violations) from the database 104 and apply each of the retrieved set of repair patterns 110 on the second set of violations 116. The electronic device 102 may be configured to determine whether the set of repair patterns 110, automatically learned from the first set of repair examples 114, are able to repair or resolve each of the second set of violations 116 stored in the database 104. The electronic device 102 may be configured to determine a repair pattern from the set of repair patterns 110 which may not be able to repair each of the second set of violations 116. The electronic device 102 may be further configured to remove the determined repair pattern and further refine the set of repair patterns 110 based on the removal of the determined repair pattern. In some embodiments, the second set of violations 116 (i.e. which are applied with set of repair patterns 110 for the refinement) may correspond to a same type or category of violations. Examples of the type of violation may include, but are not limited to, NULL pointer dereference, out-of-bound, security issue, or malicious code vulnerability, dodgy code, performance issue, code conventions.

In one or more embodiments, the electronic device 102 may be configured to generate various repair examples by the application of different repair patterns on the second set of violations 116 (i.e. unfixed violations). The electronic device 102 may be further configured to receive a user input from the user 118. The user input may be a selection of one or more of the generated repair examples. The electronic device 102 may be configured to add the selected repair examples, as the repair pattern, to the first set of repair examples 114 for further refinement of the repair patterns based on the human feedback or selection.

Examples of the electronic device 102 may include, but are not limited to, an integrated development environment (IDE) device, a software testing device, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. Examples of the user-end terminal device may include, but are not limited to, a mobile device, a desktop computer, a laptop, and a computer work-station. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

In one or more embodiments, the electronic device 102 may include a neural network or machine learning system trained to automatically learn and generate set of repair patterns 110 based on the generated repair examples which repaired one or more of the second set of violations 116 (unfixed violations). Examples of the neural network may include, but are not limited to, a deep neural network (DNN), a recurrent neural network (RNN), an artificial neural network (ANN), a convolutional neural network (CNN), a CNN-recurrent neural network (CNN-RNN), R-CNN, a Long Short Term Memory (LSTM) network based RNN, a fully connected neural network, a Connectionist Temporal Classification (CTC) based RNN, a deep Bayesian neural network, a Generative Adversarial Network (GAN), and/or a combination of such networks.

The database 104 (for example, Big Code) may comprise suitable logic, interfaces, and/or code that may be configured to store the set of repair patterns 110, the first set of violations 112, the first set of repair examples 114, and the second set of violations 116 (i.e. unfixed violations). In some embodiments, the database 104 may store different software programs, code, libraries, applications, scripts, or routines associated with the first set of violations 112, the first set of repair examples 114, and the second set of violations 116.

The database 104 may be a relational or a non-relational database. Also, in some cases, the database 104 may be stored on a server, such as a cloud server or may be cached and stored on the electronic device 102. The server of the database 104 may be configured to receive a request to provide data, violations, or programs from the electronic device 102, via the communication network 108. In response, the server of the database 104 may be configured to retrieve and provide the data, violations, or programs to the electronic device 102 based on the received request, via the communication network 108. Additionally or alternatively, the database 104 may be implemented using hardware including a processor, a microprocessor (e.g., to perform or control performance of one or more operations), a field-programmable gate array (FPGA), or an application-specific integrated circuit (ASIC). In some other instances, the database 104 may be implemented using a combination of hardware and software.

The user-end device 106 may comprise suitable logic, circuitry, interfaces, and/or code in which the generated or refined set of repair patterns 110 may be deployed. The user-end device 106 may include one or more of an integrated development environment (IDE), a code editor, a software debugger, software development kit, or a testing application which may recommend to the user 118 and/or apply the deployed set of repair patterns 110 to repair different violations that may be identified in the software program during various software development stages, especially during code testing or verification and validation (V&V) stage. Examples of the user-end device 106 may include, but are not limited to, a mobile device, a desktop computer, a laptop, a computer work-station, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The communication network 108 may include a communication medium through which the electronic device 102 may communicate with and the server which may store the database 104 and the user-end device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

Figure 2:
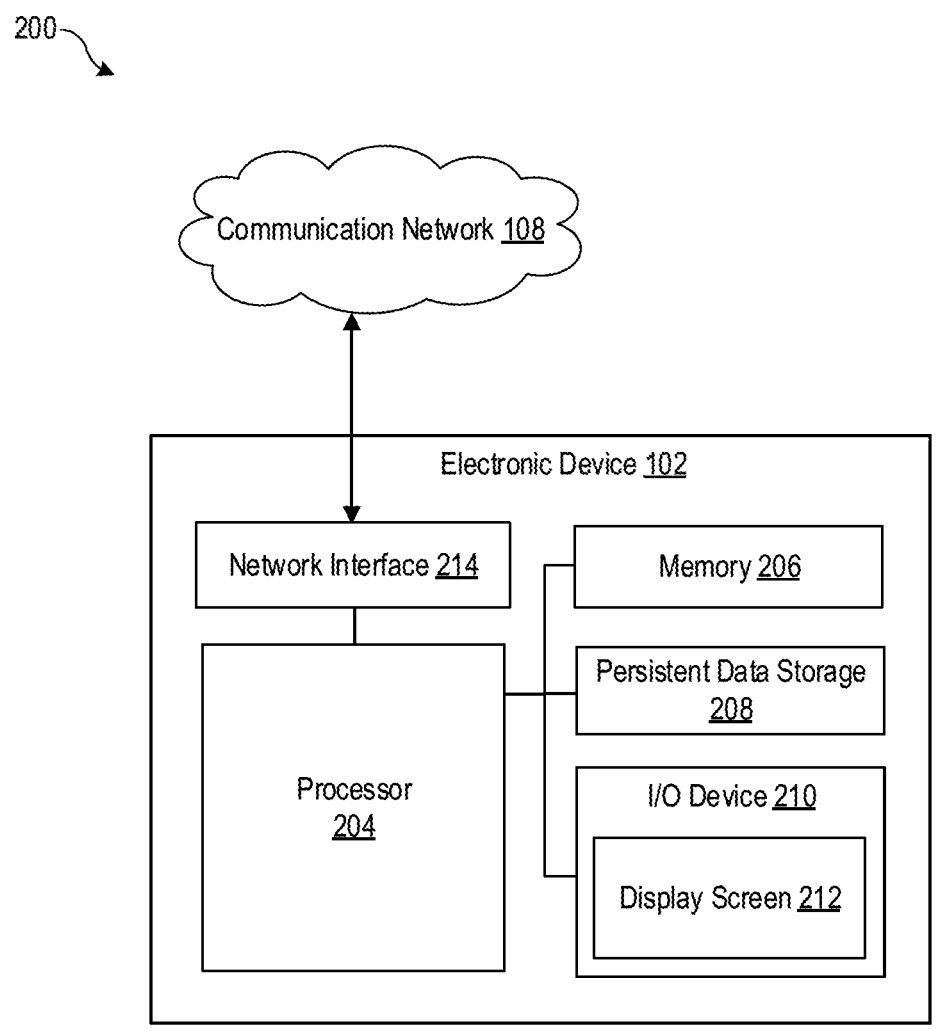
FIG. 2 is a block diagram that illustrates an exemplary electronic device for refinement of repair patterns for static analysis violations in software programs.

FIG. 2 is a block diagram that illustrates an exemplary electronic device for refinement of repair patterns for static analysis violations in software programs, arranged in accordance with at least one embodiment described in the present disclosure. FIG. 2 is explained in conjunction with elements from FIG. 1. With reference to FIG. 2, there is shown a block diagram 200 of the electronic device 102. The electronic device 102 may include a processor 204, a memory 206, a persistent data storage 208, an input/output (I/O) device 210, a display screen 212, and a network interface 214.

The processor 204 may comprise suitable logic, circuitry, and/or interfaces that may be configured to execute program instructions associated with different operations to be executed by the electronic device 102. For example, some of the operations may include retrieval of the set of repair patterns 110 and the second set of violations 116 from the database 104, application of the set of repair patterns 110 on the second set of violations 116, generation of the repair examples, reception of the user inputs to select one or more of the generated repair examples, and further refinement of the set of repair patterns 110 based on the application and the selection. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the set of repair patterns 110 and the second set of violations 116 retrieved from the database 104. In some embodiments, either of the memory 206, the persistent data storage 208, or combination may store one or more repair examples generated during the application of the set of repair patterns 110 on the second set of violations 116 (i.e. unfixed violation). In some embodiments, either of the memory 206, the persistent data storage 208, or combination may store a neural network to learn more repair patterns based on the generated repair examples to repair one or more of the second set of violations 116.

The I/O device 210 may include suitable logic, circuitry, interfaces, and/or code that may be configured to receive a user input (for example, the user input to select the generated repair examples). The I/O device 210 may be further configured to provide an output in response to the user input. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display and a speaker.

The display screen 212 may comprise suitable logic, circuitry, interfaces, and/or code that may be configured to render the generated repair examples to the user 118 for selection of one or more repair examples, as the repair patterns, for refinement of the set of repair patterns 110. The display screen 212 may be configured to receive the user input from the user 118 to select the one or more repair examples. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the database 104, and the user-end device 106, via the communication network 108. The network interface 214 may be implemented by use of various known technologies to support wired or wireless communication of the electronic device 102 via the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
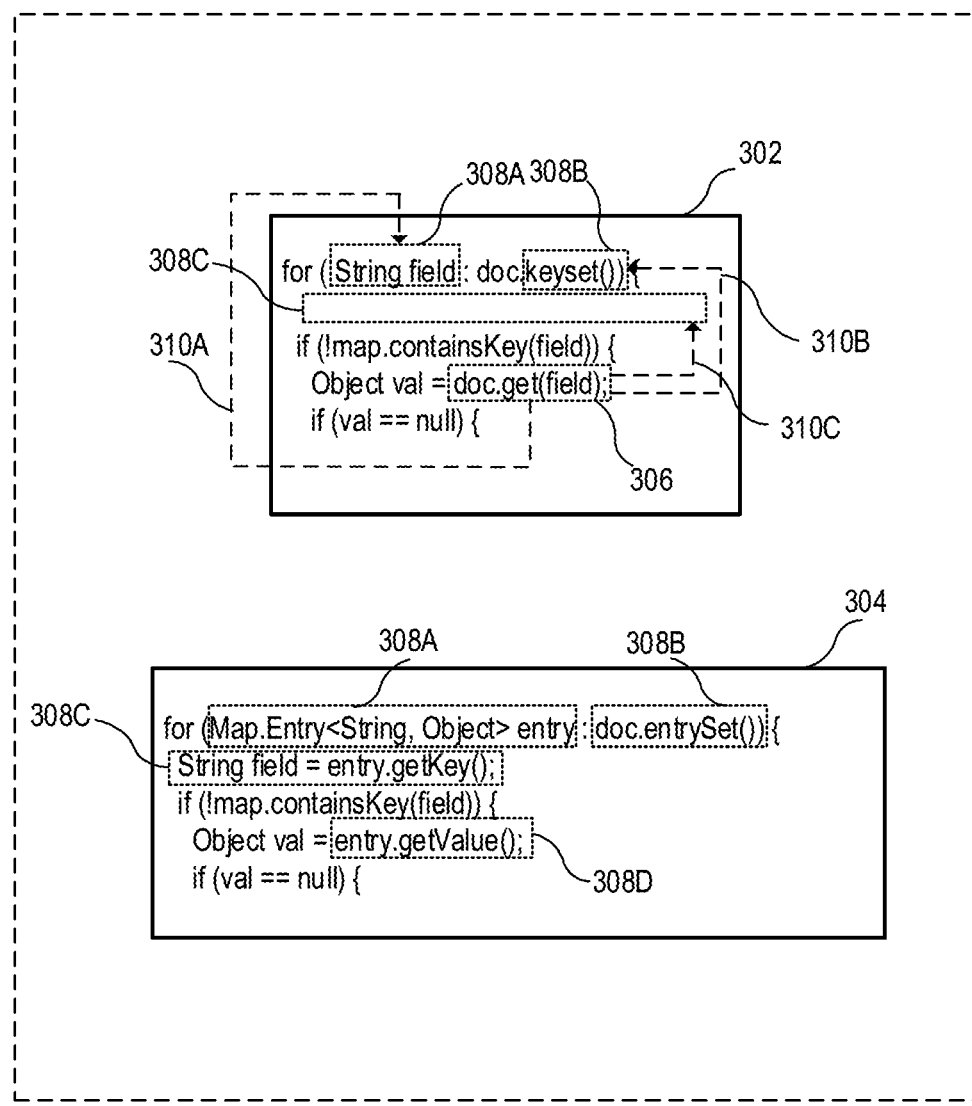
FIG. 3A illustrates an example of defected software program including a violation and a repaired software program.

FIG. 3A illustrates an example of defected software program including a violation and a repaired software program, arranged in accordance with at least one embodiment described in the present disclosure. FIG. 3A is explained in conjunction with elements from FIG. 1 and FIG. 2. With reference to FIG. 3A, there is shown an example of a defective software program 302. The defective software program 302 may include a code, scripts, or routines associated with a domain specific language (DSL), for example, Java. The defective software program 302 may include a violation (for example "doc.get(field);", as shown) at a primary node 306. The violation may indicate a fault or a bug which may affect the performance of the defective software program 302. In some embodiments, the defective software program 302 may include a plurality of violations including the violation at the primary node 306. The violation may be identified by the static code analysis tools known in the art. The violation may also correspond to a location of the violation detected in the defective software program 302. The location of the violation may be referred as the primary node 306 (or a main node) with respect to which different edit nodes may be identified or different edit operations may be performed.

In FIG. 3A, there is also shown an improved software program 304. The improved software program 304 may be a repaired version of the defective software program 302. The defective software program 302 may be repaired based on repair example applied on the defective software program 302 to obtain the improved software program 304. The repair example may correspond to one or more edit operations performed on the defective software program 302 to obtain the improved software program 304. In FIG. 3A, there is shown a set of edit nodes 308A to 308D. There is also shown a set of edit operations (i.e. modifications or transformation performed on one or more instructions/commands) performed on the set of edit nodes 308A to 308D of the defective software program 302 to obtain the improved software program 304. In general, an edit operation for a given edit node may correspond to one or more of a replacement/exchange, appending code, a correction, a new addition, a deletion, a positional shift, or other modifications to a portion of code associated with the given edit node. For example, as shown in FIG. 3A, a first edit operation ("Map.Entry<String, Object>entry") may be added at a first edit node 308A, a second edit operation ("doc.entrySet( )") may be modified at a second edit node 308B, a third edit operation ("String field=entry.getKey( );") may be added at a third edit node 308C, and a fourth edit operation ("entry.getValue( );") may be added at a fourth edit node 308D (or the primary node 306).

In FIG. 3A, there is also shown a set of locators 310A to 310C which may indicate a relation between the primary node 306 of the violation and each of the edit nodes 308A to 308D (i.e. locations at which coded have to be repaired). In some embodiments, the set of locators 310A to 310C or the relation between the primary node 306 and the edit nodes 308A to 308D may be analyzed to generate the set of repair patterns 110 (also referred to as fix patterns). The generated set of repair patterns 110 may indicate the edit nodes 308A to 308D and the corresponding edit operations to repair the violation and obtain the improved software program 304.

FIG. 3B illustrates exemplary repair patterns to repair violations in a software program, arranged in accordance with at least one embodiment described in the present disclosure. FIG. 3B is explained in conjunction with elements from FIG. 1, FIG. 2, and FIG. 3A. With reference to FIG. 3B, there is shown an example of a first software program 312. The first software program 312 may include a violation ("insQueries.get(name)", as shown) at a primary node 314. The violation may be detected from the first software program 312 using the static code analysis tool on the first software program 312. In FIG. 3B, there is also shown a second software program 316. The second software program 316 may correspond a first repair pattern or (fix pattern) generated based on the identification of edit nodes and edit operations performed on the edit nodes. For example, as shown in FIG. 3B, the second software program 316 may include a first edit node 320 at which a first edit operation ("String name=entry.getKey( )" as shown) may be performed. The first edit node 320 may be at a line before a first parent node 318 (i.e. defined by "if (!para ms. isEmpty( )) {") of a statement of the violation located at the primary node 314 in the second software program 316. Thus, based on the primary node 314, the first parent node 318, and the first edit node 320, the first repair pattern may be generated. The second software program 316 may indicate an edit operation ("entry.getValue( )") at the primary node 314.

The first repair pattern may correspond to a first locator which may represent a relation between the primary node 314 and the first edit node 320 which may be at the line before the first parent node 318 of the statement at the primary node 314, as shown in the second software program 316 of FIG. 3B. The edit operations (i.e. "String name=entry.getKey( )") performed on the first edit node 320 may be further analyzed by the static code analyzer tool to confirm the repair of the violation 314.

In FIG. 3B, there is also shown a third software program 322 which may be repaired based on a second repair pattern. For example, in case, the static code analysis of the second software program 316 indicates a violation, then a second locator may be identified as the second repair pattern. The second locator may represent a relation between the primary node 314 and an edit node (not shown) which may be at a beginning position of body of a second parent node which may be before the first parent node 318 of the statement of the violation at the primary node 314. As shown, since there is no second parent node of the statement in the third software program 322, then the static code analysis tool may flag a violation after analyzing the third software program 322.

In FIG. 3B, there is also shown a fourth software program 324 which may be repaired based on a third repair pattern. The third repair pattern may indicate a third locator as a relation between the primary node 314 and a second edit node 328. For example, the third repair pattern may indicate a process to identify a first parameter 326 ("name") of the violation at the primary node 314 and further make declaration ("String name=entry.getKey( )") of the first parameter 326, as the edit operation, at the second edit node 328 which may at a beginning position of body of the first parent node 318 of the statement of the violation at the primary node 314.

It may be noted here that the first repair pattern, the second repair pattern, and the third repair pattern described in FIG. 3B, are merely provided as an example. However, there may be several types of the repair patterns to define the edit nodes and edit operations performed at corresponding edit node, without departing from the scope of the present disclosure.

Figure 4:
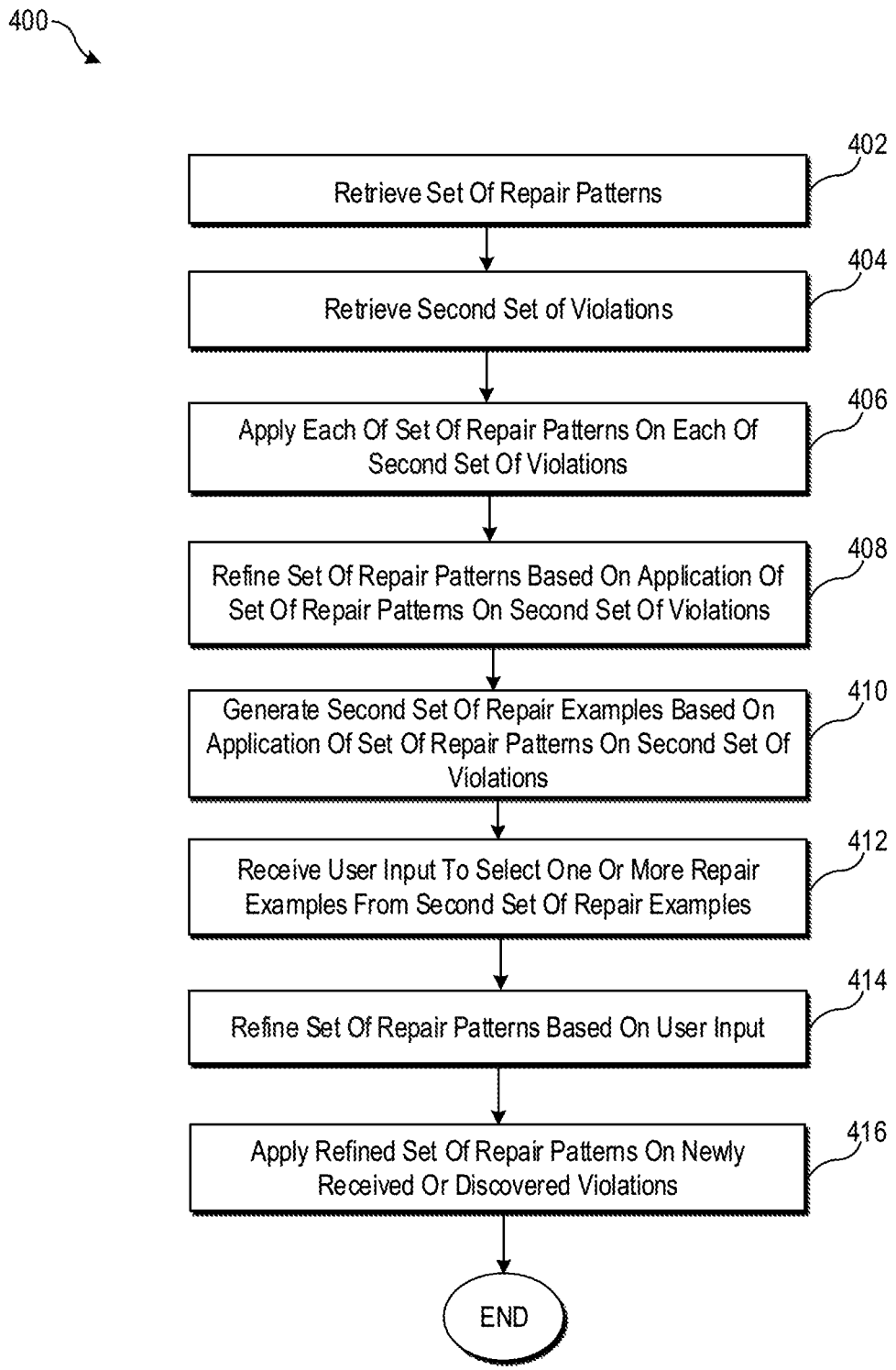
FIG. 4 is a flowchart of an example method for refinement of repair patterns for static analysis violations in software programs.

FIG. 4 is a flowchart of an example method for refinement of repair patterns for static analysis violations in software programs, arranged in accordance with at least one embodiment described in the present disclosure. FIG. 4 is explained in conjunction with elements from FIG. 1, FIG. 2, FIG. 3A, and FIG. 3B. With reference to FIG. 4, there is shown a flowchart 400. The method illustrated in the flowchart 400 may start at 402 and may be performed by any suitable system, apparatus, or device, such as by the example electronic device 102 of FIG. 1 or FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the set of repair patterns 110 may be retrieved. In some embodiments, the processor 204 may be configured to retrieve the set of repair patterns 110 from the database 104. In another embodiment, the processor 204 may retrieve the set of repair patterns 110 stored in the either of the memory 206, the persistent data storage 208 or a combination thereof. The set of repair patterns 110 may be learned or generated based on the first set of repair examples 114 (or edit operations) which are able to repair the first set of violations 112. In some embodiments, the processor 204 may be configured to retrieve the first set of violations 112 and the first set of repair examples 114 from the database 104 and automatically generate the set of repair patterns 110 based on analysis of the first set of repair examples 114.

At block 404, the second set of violations 116 (i.e. unseen or unfixed violations) are retrieved. In some embodiments, the processor 204 may be configured to retrieve the second set of violations 116 from the database 104 stored in the memory 206 and/or the persistent data storage 208. The second set of violations 116 may be the faults or bugs of the software program which may not have been repaired with repair examples or the edit operations to repair violations. In some embodiments, all violations in the second set of violations 116 may be of same violation type.

At block 406, each of the set of repair patterns 110 may be applied on each of the second set of violations 116. In some embodiments, the processor 204 may be configured to execute or apply each of the set of repair patterns 110 on each of the retrieved second set of violations 116. The processor 204 may be configured to apply different repair patterns or edit operations defined by the set of repair patterns 110 on the second set of violations 116 (unfixed violations) to repair the second set of violations 116. Certain examples of the set of repair patterns 110 are described in FIG. 3B.

At block 408, set of repair patterns 110 may be refined. The processor 204 may determine a repair pattern which may not be able to repair each of the second set of violations 116 or a threshold number (e.g., more than "90%") of the second set of violations 116. The processor 204 may be configured to determine the repair pattern from the set of repair patterns 110 based on the application of the set of repair patterns 110 on the second set of violations 116 as per the block 406.

The processor 204 may be further configured to remove or delete the determined repair pattern from the set of repair patterns 110 since the determined repair pattern is not able to repair one or more unfixed violation in the second set of violations 116. The processor 204 may be configured to refine the set of repair patterns 110 based on the removal of the repair pattern determined from the set of repair patterns 110. Thus, the processor 204 of the disclosed electronic device 102 may be able to determine whether the set of repair patterns 110, automatically learned based on the set of repair patterns 110, are also capable of repairing the unfixed or unseen violation (i.e. the second set of violations 116) or not. If not, such repair patterns are also removed to refine the set of repair patterns 110 such that the refined set of repair patterns provide an improved accuracy to repair violations in the software programs. In some embodiments, the refined set of repair patterns may include one repair pattern (as "One Best" repair pattern) capable of repairing all unfixed violations of a particular type.

At block 410, one or more repair examples may be generated based on the application of the set of repair patterns 110 on the second set of violations 116. In some embodiments, the processor 204 may be configured to generate a repair result based on application of each of the set of repair patterns 110 on the each of the second set of violations 116. The repair result may indicate whether the corresponding unfixed violation is repaired or resolved by applying one of the set of repair patterns 110. In some embodiments, the static code analysis tool may generate the repair result (i.e. repair or violation) based on the analysis of the software program obtained by the application of each of the set of repair patterns 110 on each of the second set of violations 116. In case of determination that the corresponding unfixed violation is repaired, the processor 204 may be configured to generate a repair example (i.e. may be different from the first set of repair examples 114) associated with the corresponding unfixed violation being repaired. Thus, the processor 204 may generate a second set of repair examples by iteratively executing or applying the set of repair patterns 110 on the second set of violations 116.

At block 412, a user input may be received to select one or more repair examples from the second set of repair examples. In some embodiment, the processor 204 may be configured to receive the user input from the user 118 through I/O device 210 or the display screen 212. The processor 204 may be configured to select the one or more repair examples from the second set of repair examples (as generated at block 412).

At block 414, the set of repair patterns 110 may be refined based on the user input. In some embodiments, the processor 204 may be configured to further refine the set of repair patterns 110 (as earlier refined at the block 408). The processor 204 may add the selected one or more repair examples (as additional repair patterns or strategies) in the refined set of repair patterns 110 based on the user input received from the user 118 at block 412. Thus, the refinement of the set of repair patterns 110 may be further based on an intervention or feedback received from the user 118 (e.g., an experienced software developer).

At block 416, the refined set of repair patterns 110 may be applied on newly received or discovered violations. In some embodiments, the processor 204 may be configured to retrieve or receive newly discovered violations from the database 104. The newly discovered violations may be included in a second software program. The processor 204 may be further configured to apply the refined set of repair patterns 110 (as refined at block 408 and block 414) on the newly received violations to repair the newly discovered violations or to further test whether the refined set of repair patterns 110 can be used to repair the newly discovered violations in the database 104 or not. In case of repair, the application of the refined set of repair patterns 110 on the newly received violations may generate a repaired second software program. Thus, based on the refinement of the set of repair patterns 110 due to one of or a combination thereof of unfixed violations, human feedback, or newly discovered violations, the accuracy or quality of the learned set of repair patterns 110 to repair unfixed violations may be increased. The Control may pass to end.

Although the flowchart 400 is illustrated as discrete operations, such as 402, 404, 406, 408, 410, 412, 414, and 416. However, in certain embodiments, such discrete operations may be further divided into additional operations, combined into fewer operations, or eliminated, depending on the particular implementation without detracting from the essence of the disclosed embodiments.

Figure 5A:
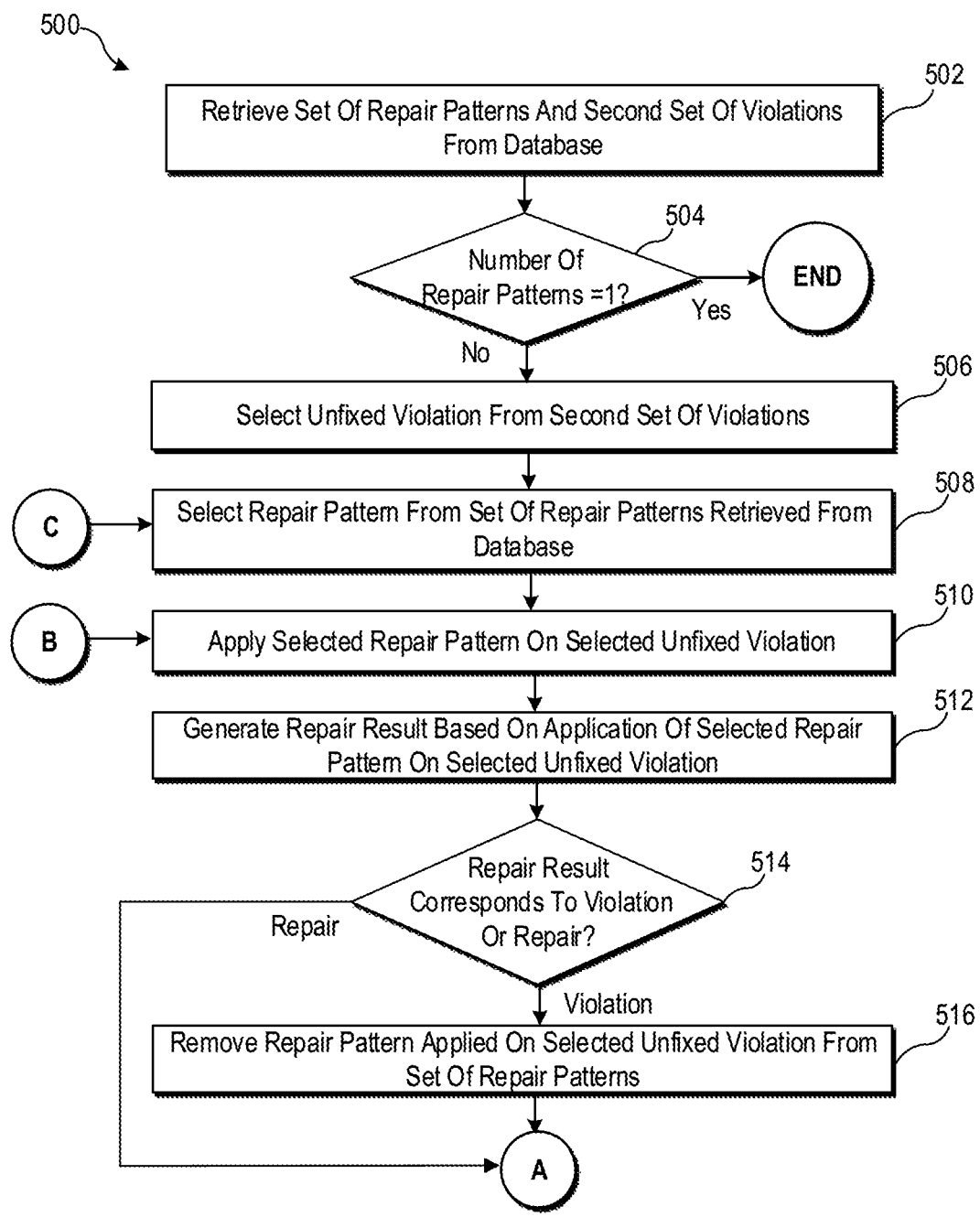
FIGS. 5A and 5B, collectively, illustrate a flowchart of an example method for refinement of repair patterns based on the application of repair patterns on violations in software programs.
Figure 5B:
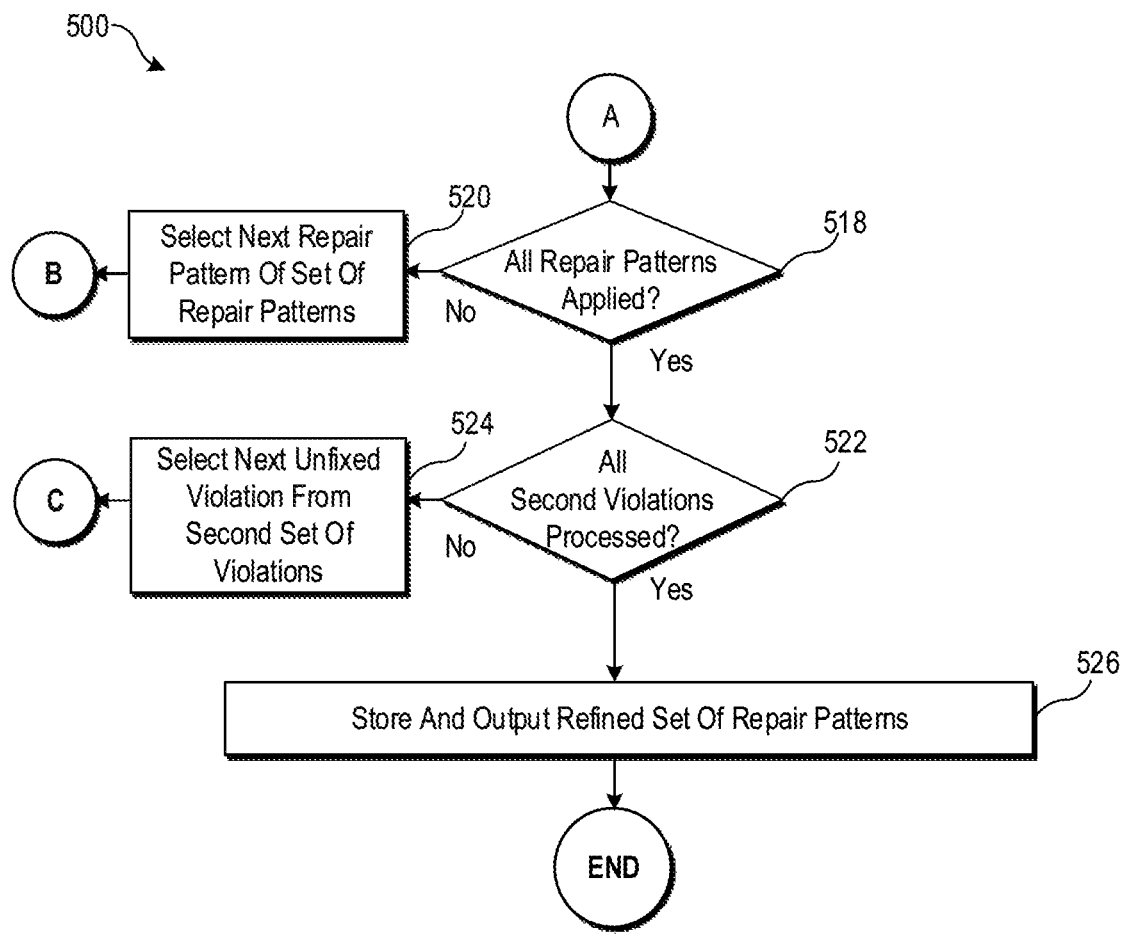

FIGS. 5A and 5B collectively illustrate a flowchart of an example method for refinement of repair patterns based on the application of repair patterns on violations in software programs, arranged in accordance with at least one embodiment described in the present disclosure. FIGS. 5A and 5B are explained in conjunction with elements from FIG. 1, FIG. 2, FIG. 3A, FIG. 3B, and FIG. 4. With reference to FIGS. 5A and 5B, there is shown a flowchart 500. The method illustrated in the flowchart 500 may start at 502 and may be performed by any suitable system, apparatus, or device, such as by the example electronic device 102 of FIG. 1 or FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, the set of repair patterns 110 and the second set of violations 116 may be retrieved from the database 104. In some embodiments, the processor 204 may be configured to retrieve the set of repair patterns 110 (or fix patterns) and the second set of violations 116 (unfixed violations) from the database 104, as described in block 402 and block 404.

At block 504, it may be determined whether a number or size of the set of repair patterns 110 is equal to "1". The processor 204 may be configured to determine whether the number or size of the set of repair patterns 110 is "1" or not. In cases where the determined number is "1", there may be only one repair pattern available or generated based on the first set of repair examples 114. Thus, further refinement of one repair pattern may not be possible and control passes to end and no further refinement is performed. Otherwise, the control passes to block 506.

At block 506, an unfixed violation (for example first unfixed violation) may be selected from the second set of violations 116. In some embodiments, the processor 204 may be configured to select the first unfixed violation from the second set of violations 116 retrieved from the database 104. The selected first unfixed violation may be associated with a particular software program in a particular DSL.

At block 508, a repair pattern (for example first repair pattern) may be selected from the set of repair patterns 110 (as retrieved from the database 104 in the block 502). In some embodiments, the processor 204 may be configured to select the first repair pattern from the set of repair patterns 110.

At block 510, the selected repair pattern may be applied on the selected unfixed violation. The processor 204 may be configured to apply or execute the repair pattern selected from the set of repair patterns 110 on the selected unfixed violation to repair or resolve the selected unfixed violation of the software program. The selected repair pattern may correspond to one or more edit operations which may be applied to the selected unfixed violation, as described in detail in FIGS. 3A and 3B.

At block 512, a repair result may be generated based on the application of the selected repair pattern on the selected unfixed violation. In some embodiments, the processor 204 may be configured to generate the repair result to determine whether the selected repair pattern is able to repair the selected unfixed violation or not. In another embodiment, the repair result be generated with the static code analysis tool associated with the disclosed electronic device 102.

At block 514, it may be determined whether the generated repair result corresponds to a violation or a repair of the selected unfixed violation. In some embodiments, the processor 204 may be configured to determine whether generated repair result at block 512 corresponds to the violation. In cases the repair result corresponds to the violation, this may indicate that the applied repair pattern may not be able to repair the selected unfixed violation. The control passes to block 516. Otherwise, in cases, where the generated repair result corresponds to the repair of the selected unfixed violation, the control passes to block 518.

At block 516, the repair pattern applied on the selected unfixed violation may be removed from the set of repair patterns 110. In some embodiments, the processor 204 may be configured to remove the repair pattern, (i.e. which may be not able to repair the selected unfixed violation) from the set of repair patterns 110 for the refinement of the set of repair patterns 110.

At block 518, it may be determined whether all the set of repair patterns 110 are applied on the selected unfixed violation. The processor 204 may be configured to determine whether all the set of repair patterns 110 are applied on the selected unfixed violation. In cases, all the set of repair patterns 110 are not applied on the selected unfixed violation, the control passes to block 520. Otherwise, the control passes to block 522.

At block 520, next repair pattern of the set of repair patterns 110 may be selected. In some embodiments, the processor 204 may be configured to select the next repair pattern from the set of repair patterns 110. The control passes to block 510 so that each of the set of repair patterns 110 may be applied on the selected unfixed violation. Thus, the operations of block 510 to block 520 may be iteratively executed by the electronic device 102 or the processor 204 based on the application of the set of repair patterns 110 on the selected unfixed violation.

At block 522, it may be determined whether all the second set of violations 116 are processed with the set of repair patterns 110. In some embodiments, the processor 204 may be configured to determine whether all the second set of violations 116 are processed with the set of repair patterns 110. In cases, all the second set of violations are not processed, the control passes to block 524. Otherwise the control passes block 526.

At block 524, a next unfixed violation may be selected from the second set of violations 116. In some embodiments, the processor 204 may be configured to select the next unfixed violation from the second set of violations 116. The control passes to block 508 so that each of the set of repair patterns 110 may be applied on each of the second set of violations 116. Thus, the operations from block 508 to block 524 may be iteratively executed by the electronic device 102 or the processor 204 based on the application of the set of repair patterns 110 on the second set of violations 116.

At block 526, the refined set of repair patterns may be stored and output on the display screen 212. In an embodiment, the refined set of repair patterns may be stored in the memory 206 or the persistent data storage 208. In another embodiment, the processor 204 may commit the refined set of repair patterns to the database 104. In some embodiments, the refined set of repair patterns may be displayed to the user 118 through the display screen 212. In some embodiments, refinement of the set of repair patterns 110 performed from block 502 to block 526 may be execute on the second set of violations 116 of same violation type, or a different violation type.

Although the flowchart 500 is illustrated as discrete operations, such as 502, 504, 506, 508, 510, 512, 514, 516, 518, 520, 522, 524, and 526. However, in certain embodiments, such discrete operations may be further divided into additional operations, combined into fewer operations, or eliminated, depending on the particular implementation without detracting from the essence of the disclosed embodiments.

Figure 6A:
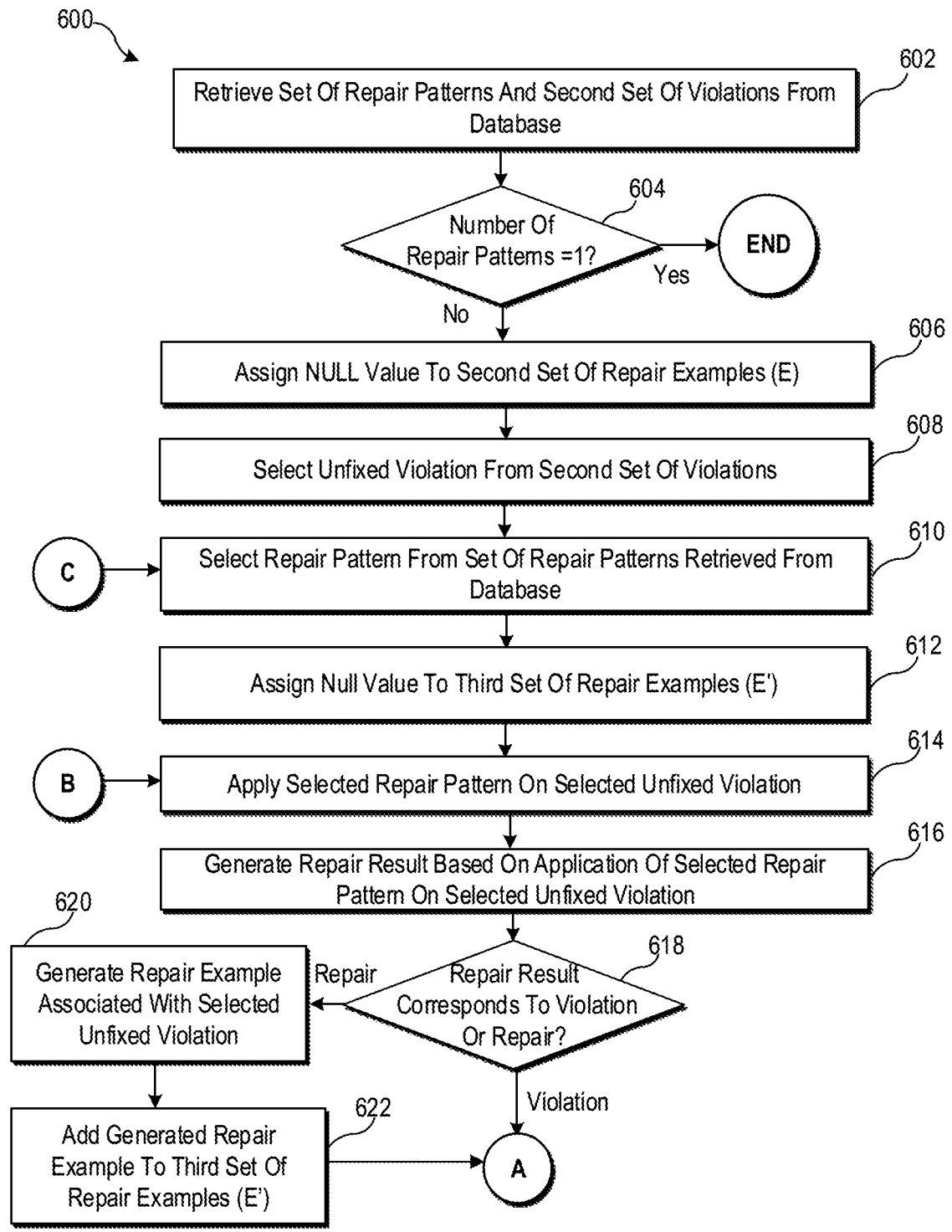
FIGS. 6A and 6B, collectively, illustrate a flowchart of an example method for refinement of repair patterns based on human feedback, all according to at least one embodiment described in the present disclosure.
Figure 6B:
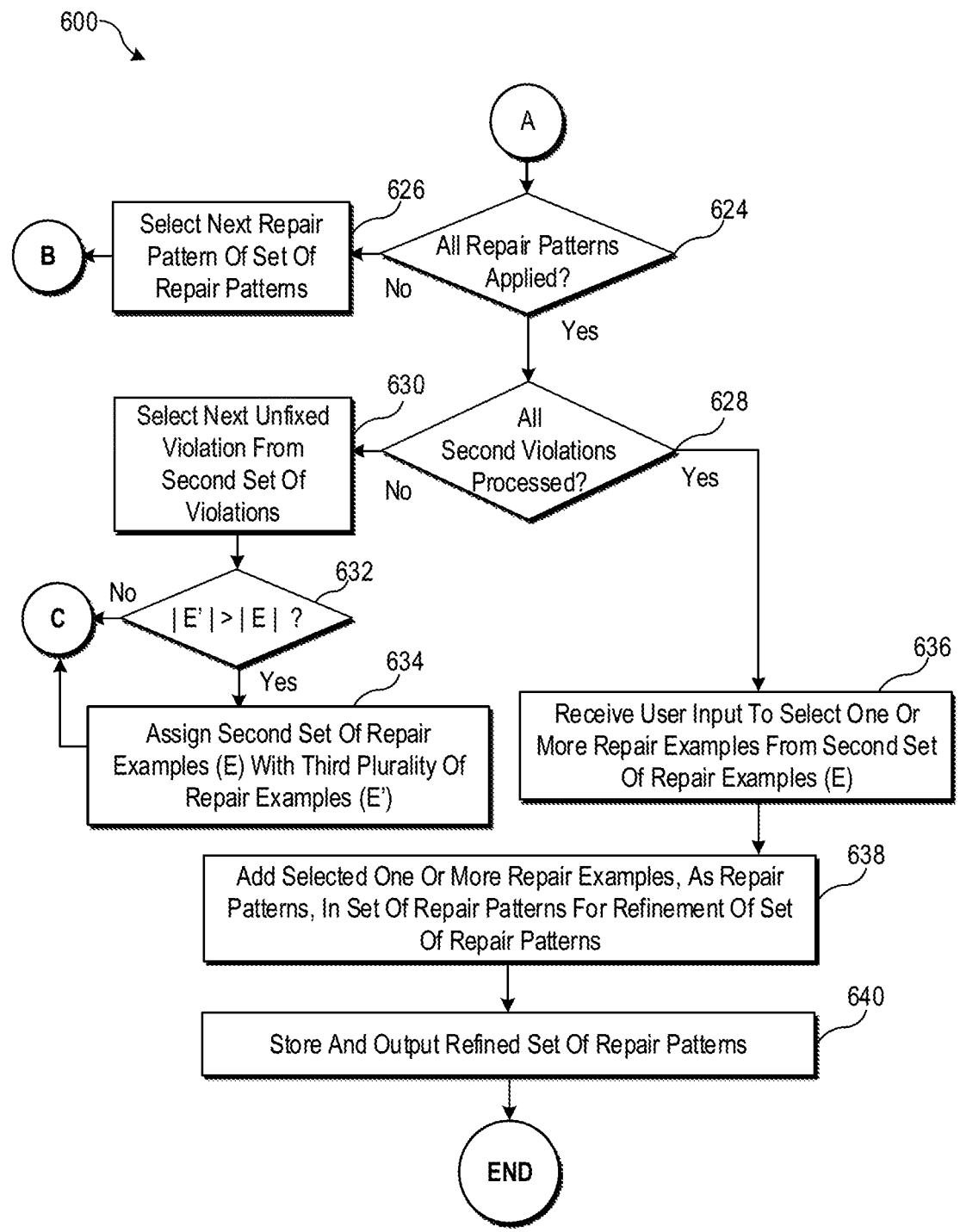

FIGS. 6A and 6B, collectively illustrate a flowchart of an example method for refinement of repair patterns based on human feedback, arranged in accordance with at least one embodiment described in the present disclosure. FIGS. 6A and 6B are explained in conjunction with elements from FIG. 1, FIG. 2, FIG. 3A, FIG. 3B, FIG. 4, FIG. 5A, and FIG. 5B. With reference to FIGS. 6A and 6B, there is shown a flowchart 600. The method illustrated in the flowchart 600 may start at 602 and may be performed by any suitable system, apparatus, or device, such as by the example electronic device 102 of FIG. 1 or FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, the set of repair patterns 110 and the second set of violations 116 may be retrieved from the database 104 (as also performed at block 502). At block 604, it may be determined whether a number or size of the set of repair patterns 110 is equal to "1" as performed at block 504.

At block 606, the second set of repair examples may be assigned a NULL value. The processor 204 may be configured to assign the NULL value to the second set of repair examples (for example, referred as "E"). The NULL value may represent that the second set of repair examples may not include any repair example. In some embodiments, the processor 204 may be configured to initialize a first number or first size of the second set of repair examples to "0".

At block 608, an unfixed violation (for example first unfixed violation) may be selected from the second set of violations 116 (as also performed at block 506). At block 610, a repair pattern (for example first repair pattern) may be selected from the set of repair patterns 110 (as also performed at block 508).

At block 612, a third set of repair examples may be assigned a NULL value. The processor 204 may be configured to assign the NULL value to the third set of repair examples (for example referred as E'). The NULL value may represent that the third set of repair examples may not include any repair example. In some embodiments, the processor 204 may be configured to initialize a second number or second size of the second set of repair examples "0".

At block 614, the selected repair pattern may be applied on the selected unfixed violation (as also performed at block 510). At block 616, the repair result may be generated based on the application of the selected repair pattern on the selected unfixed violation (as also performed at block 512).

At block 618, it may be determined whether the generated repair result correspond to the repair of the selected unfixed violation. In an embodiment, the processor 204 may be configured to determine whether the generated repair result corresponds to the repair of the selected unfixed violation. In another embodiment, the static code analysis tool associated with the electronic device 102 may detect whether the generated repair result corresponds to the repair. In cases where the generated repair result corresponds to the repair of the selected unfixed violation, the control passes to 620. Otherwise, the control passes to 624.

At block 620, a repair example associated with the selected unfixed violation may be generated. In some embodiments, the processor 204 may be configured to generate the repair example which may refer to edit nodes or one or more edit operations performed on the selected unfixed violation based on the applied repair pattern resulting in the repair of the selected unfixed violation.

At block 622, the generated repair example may be added to the third set of repair examples (referred as E'). In some embodiments, the processor 204 may be configured to add the generated repair example to the third set of repair examples. The processor 204 may be further configured to increase the second number or size of the third set of repair examples by "1".

At block 624, it may be determined whether all of the set of repair patterns 110 are applied on the selected unfixed violation (as also performed at block 518). In cases where all the set of repair patterns 110 are not applied on the selected unfixed violation, the control passes to block 626. Otherwise, the control passes to block 628.

At block 626, next repair pattern of the set of repair patterns 110 may be selected (as also performed at block 520). The control passes to 614 so that each of the set of repair patterns 110 may be applied on the selected unfixed violation and generate the third set of repair examples which generated the repair result as repair for the selected unfixed violation at block 620.

At block 628, it may be determined whether all of the second set of violations 116 are processed with the set of repair patterns 110 (as also performed at block 522). In cases, all the second set of violations are not processed, the control passes to block 630. Otherwise the control passes to block 636.

At block 630, next unfixed violation may be selected from the second set of violations 116 (as also performed at block 524). At 632, it may be determined whether the second number (or second size) of the third set of repair examples (referred as E') is more than the first number (or first size) of the second set of repair examples (referred as E). In cases where the second number is lesser then than the first number, the control passes to block 610. Otherwise, the control passes to 634.

At block 634, the second set of repair examples may be assigned with the third set of repair examples. In some embodiments, the processor 204 may assign the generated repair examples in the third set of repair examples (referred as E') to the second set of repair examples (referred as E). This assignment may indicate that when the application of the set of repair patterns 110 on one unfixed violation generates more number of repair examples, as compared to when applied on other unfixed violation, then the higher number of repair examples should be considered. This may also indicate to identify on which unfixed violation the maximum number of the set of repair patterns 110 were successful in repairing. Control passes to 610.

At block 636, the user input may be received to select one or more repair examples from the generated second set of repair examples. In some embodiments, the processor 204 may be configured to receive the user input from the user 118 through I/O device 210 or the display screen 212 (as also performed at block 412) to select the one or more repair examples. The one or more repair examples selected by the user 118 as the human feedback may be further used to refine the set of repair patterns 110 and increase the accuracy of the set of repair patterns 110 based on the human feedback or selection received from the user 118.

At block 638, the selected one or more repair examples may be added, as the repair patterns, in the set of repair patterns 110 to further refine the set of repair patterns 110. In some embodiments, the processor 204 may be configured to add the selected one or more repair examples, as the repair patterns, into the set of repair patterns 110 as refinement based on the human feedback.

At block 640, the refined set of repair patterns may be stored and output at the display screen 212 (as also performed at block 526). Control passes to end.

Although the flowchart 600 is illustrated as discrete operations, such as 602, 604, 606, 608, 610, 612, 614, 616, 618, 620, 622, 624, 626, 628, 630, 632, 634, 636, 638, and 640. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as the example electronic device 102) to perform operations. The operations may include operations may include retrieving a set of repair patterns, wherein each of the set of repair patterns is learned based on a first set of repair examples associated with a first set of violations of software programs. The operations may further include retrieving a second set of violations of the software programs, wherein each of the second set of violations is an unfixed violation. The operations may further include selecting an unfixed violation of a first software program from the retrieved second set of violations of the software programs and selecting a repair pattern from the set of repair patterns. The operations may further include executing a first set of operations for the refinement of the set of repair patterns. The first set of operations may include applying the selected repair pattern on the selected unfixed violation to generate a repair result. The first set of operations may further include determining whether the generated repair result corresponds to a violation and removing the applied repair pattern from the set of repair patterns based on the determination that the generated repair result corresponds to the violation. The first set of operations may further include reselecting next repair pattern in the set of repair patterns as the selected repair pattern. The operations may further include obtaining a refined set of repair patterns by iteratively executing the first set of operations for the set of repair patterns based on the selected repair pattern.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    retrieving a set of repair patterns, wherein each of the set of repair patterns is learned based on a first set of repair examples associated with a first set of violations of software programs;
    retrieving a second set of violations of the software programs, wherein each of the second set of violations is an unfixed violation;
    selecting an unfixed violation of a first software program from the retrieved second set of violations of the software programs;
    selecting a repair pattern from the set of repair patterns;
    executing a first set of operations for the refinement of the set of repair patterns, wherein the first set of operations comprise:
        applying the selected repair pattern on the selected unfixed violation to generate a repair result,
        determining whether the generated repair result corresponds to a violation,
        removing the applied repair pattern from the set of repair patterns based on the determination that the generated repair result corresponds to the violation, and
        reselecting next repair pattern in the set of repair patterns as the selected repair pattern; and
    obtaining a refined set of repair patterns by iteratively executing the first set of operations for the set of repair patterns based on the selected repair pattern.

2. The method according to claim 1, wherein the second set of violations are of same violation type.

3. The method according to claim 1, wherein each of the set of repair patterns corresponds to one or more edit operations, as the repair example, to repair the corresponding violation of the first set of violations or the second set of violations in the software programs.

4. The method according to claim 1, further comprising:
    iteratively executing the first set of operations for the set of repair patterns for each of the retrieved second set of violations of the software programs; and
    obtaining the refined set of repair patterns based on the iteratively executing the first set of operations for each of the retrieved second set of violations.

5. The method according to claim 1, further comprising:
    generating a second set of repair examples by iteratively executing the first set of operations for the set of repair patterns, wherein the first set of operations further comprise:
        determining whether the generated repair result corresponds to a repair of the selected unfixed violation based on the applied repair pattern,
        generating a repair example associated with the selected unfixed violation based on the determination that the generated repair result corresponds to the repair of the selected unfixed violation, and
        adding the generated repair example in the second set of repair examples.

6. The method according to claim 5, further comprising:
    receiving a user input to select at least one repair example from the generated second set of repair examples; and
    obtaining the refined set of repair patterns by adding the selected at least one repair example as a repair pattern to the set of repair patterns.

7. The method according to claim 5, further comprising:
generating the second set of repair examples by iteratively executing the first set of operations for each of the retrieved second set of violations of the software programs;
receiving a user input to select at least one repair example from the generated second set of repair examples for each of the retrieved second set of violations of the software programs; and
obtaining the refined set of repair patterns by adding the selected at least one repair example as a repair pattern to the set of repair patterns for each of the retrieved second set of violations of the software programs.

8. The method according to claim 1, further comprising:
receiving a newly discovered violation of a second software program from a database;
applying one of the refined set of repair patterns on the received newly discovered violation; and
generating a repaired second software program based on the application of one of the refined set of repair patterns on the received newly discovered violation.

9. The method according to claim 1, wherein the second set of violations of the software programs are retrieved from a database.

10. One or more non-transitory computer-readable storage media configured to store instructions that, in response to being executed, cause a system to perform operations, the operations comprising:
retrieving a set of repair patterns, wherein each of the set of repair patterns is learned based on a first set of repair examples associated with a first set of violations of software programs;
retrieving a second set of violations of the software programs, wherein each of the second set of violations is an unfixed violation;
selecting an unfixed violation of a first software program from the retrieved second set of violations of the software programs;
selecting a repair pattern from the set of repair patterns;
executing a first set of operations for the refinement of the set of repair patterns, wherein the first set of operations comprise:
applying the selected repair pattern on the selected unfixed violation to generate a repair result,
determining whether the generated repair result corresponds to a violation,
removing the applied repair pattern from the set of repair patterns based on the determination that the generated repair result corresponds to the violation, and
reselecting next repair pattern in the set of repair patterns as the selected repair pattern; and
obtaining a refined set of repair patterns by iteratively executing the first set of operations for the set of repair patterns based on the selected repair pattern.

11. The one or more computer-readable storage media according to claim 10, wherein the second set of violations are of same violation type.

12. The one or more computer-readable storage media according to claim 10, wherein each of the set of repair patterns corresponds to one or more edit operations, as the repair example, to repair the corresponding violation of the first set of violations in the software programs.

13. The one or more computer-readable storage media according to claim 10, further comprising:
iteratively executing the first set of operations for the set of repair patterns for each of the retrieved second set of violations of the software programs; and
obtaining the refined set of repair patterns based on the iteratively executing the first set of operations for each of the retrieved second set of violations.

14. The one or more computer-readable storage media according to claim 10, further comprising:
generating a second set of repair examples by iteratively executing the first set of operations for the set of repair patterns, wherein the first set of operations further comprise:
determining whether the generated repair result corresponds to a repair of the selected unfixed violation based on the applied repair pattern,
generating a repair example associated with the selected unfixed violation based on the determination that the generated repair result corresponds to the repair of the selected unfixed violation, and
adding the generated repair example in the second set of repair examples.

15. The one or more computer-readable storage media according to claim 14, further comprising:
receiving a user input to select at least one repair example from the generated second set of repair examples; and
obtaining the refined set of repair patterns by adding the selected at least one repair example as a repair pattern to the set of repair patterns.

16. The one or more computer-readable storage media according to claim 14, further comprising:
generating the second set of repair examples by iteratively executing the first set of operations for each of the retrieved second set of violations of the software programs;
receiving a user input to select at least one repair example from the generated second set of repair examples for each of the retrieved second set of violations of the software programs; and
obtaining the refined set of repair patterns by adding the selected at least one repair example as a repair pattern to the set of repair patterns for each of the retrieved second set of violations of the software programs.

17. The one or more computer-readable storage media according to claim 10, further comprising:
receiving a newly discovered violation of a second software program from a database;
applying one of the refined set of repair patterns on the received newly discovered violation; and
generating a repaired second software program based on the application of one of the refined set of repair patterns on the received newly discovered violation.

18. The one or more computer-readable storage media according to claim 10, wherein the second set of violations of the software programs are retrieved from a database.

19. An electronic device, comprising:
a processor configured to:
retrieve a set of repair patterns, wherein each of the set of repair patterns is learned based on a first set of repair examples associated with a first set of violations of software programs;
retrieve a second set of violations of the software programs, wherein each of the second set of violations is an unfixed violation;
select an unfixed violation of a first software program from the retrieved second set of violations of the software programs;
select a repair pattern from the set of repair patterns;

execute a first set of operations for the refinement of the set of repair patterns, wherein the first set of operations comprise:
   apply the selected repair pattern on the selected unfixed violation to generate a repair result,
   determine whether the generated repair result corresponds to a violation,
   remove the applied repair pattern from the set of repair patterns based on the determination that the generated repair result corresponds to the violation, and
   reselect next repair pattern in the set of repair patterns as the selected repair pattern; and
obtain a refined set of repair patterns by iterative execution of the first set of operations for the set of repair patterns based on the selected repair pattern.

20. The electronic device according to claim 19, wherein the second set of violations of the software programs are retrieved from a database.

* * * * *